3,299,186
MELT BLENDING OF POLYOLEFINS
Robert G. Wallace, Tokyo, Japan, assignor to Phillips Petroleum Company, a corporation of Delaware
No Drawing. Filed Mar. 29, 1965, Ser. No. 443,639
8 Claims. (Cl. 260—897)

This application is a continuation-in-part of application Serial No. 299,146, filed August 1, 1963, and now abandoned.

This invention relates to a process for blending thermoplastic polymers. In another aspect, this invention relates to a process for the melt blending of polyolefins.

The art is well familiar with the preparation and use of a wide variety of polymeric products. Recently polymers of ethylene, particularly polyethylene, have come into prominence. Although many of these ethylene polymers have a great many applications in industry due to their chemical resistance, tensile strength, molding properties, etc., for many purposes, blends of polymers give a desirable balance of properties which are not possessed by a particular individual polymer.

Melt blending, and other blending procedures, have been proposed and tried. In many instances, melt blending is quicker and cheaper than the more involved solution blending, which requires polymer dissolution in hydrocarbon solvents, and subsequent solvent separation from the resulting polymer blend. On the other hand, where one or both of the blend components is a dry particulate polymer, the difficulty of achieving a homogeneous blend by melt mixing is a problem of considerable concern in the industry because of the substantial time period required to effect a complete blending of the polymers.

This problem of achieving a homogeneous blend manifests itself particularly in the blow molding of bottles from such blends. Bottle streak ratings were no better than D (by a test method hereinafter described), a low rating for plastic bottles, when melt blending two types of resin under the conditions of the prior art.

It is, therefore, an object of this invention to provide an improved method of producing a desired blend of polyolefins.

Another object of this invention is to produce a blend of polyolefins without having to resort to relatively more expensive solution blending.

Still another object is to provide homogeneous blends of polyolefins by dry blending so as to provide a composition which is readily formable into blown containers generally of uniform translucency.

Broadly, according to the present invention, I have found that uniform polymer blends can be prepared at a minimum amount of expense by a method comprising melt mixing two or more different polyolefins at a temperature above that at which blend solidification will occur, controlling the rate of temperature rise in the mixing zone by the introduction into said mixing zone of a limited amount of water, so that an adequate blending period is obtained in said mixing zone. I have further found that by concurrently introducing a limited amount of water sufficient to bring the water content in the mixing zone in the range from 0.1 to 5 weight parts per 100 weight parts of polyolefins in the mixing zone that an adequate blending period, ranging from 2 to 6 minutes, for a homogeneous product is obtained. During said blending period, and preferably just before passing the blend from the mixing zone to further processing, such as an extruder, steam is vented from said mixing zone.

The invention is applicable to the melt blending of polyolefins such as the homopolymers and copolymers of mono-1-olefins containing from 2 to 8 carbon atoms per molecule, especially copolymers of ethylene, and particularly high density polymers of ethylene. By the various test methods used, these polymers show at least some degree of crystallization at atmospheric temperatures.

The polyolefin homopolymers and copolymers that can be blended in accordance with this invention can be prepared in accordance with any of the techniques well known to those skilled in the polymerization art. The invention is applicable to the melt blending of polyolefins in particle form and polyolefins produced by solution polymerization processes. A suitable process for synthesizing polyolefins in particle form is described in British Patent No. 853,414, published November 9, 1960. The polymers made according to this method are adapted to dry blending by the method of the present invention.

A suitable process and catalyst system for synthesizing polyolefins in solution is described in U.S. Patent No. 2,825,721 (1958) and 2,951,816 (1960), to Hogan and Banks. The homopolymers and copolymers made according to this method are adapted to dry blending by the method of the present invention.

Ethylene polymers, particularly polyethylene, can, for example, be formed in a solution polymerization step wherein the polymer is formed in solution in a suitable liquid hydrocarbon diluent. The solution polymerization step is ordinarily carried out at a temperature above the precipitation temperature of the polymer so that substantially all of the polymer is soluble in the diluent, usually 240 to 310° F., with Cr oxide catalyst.

When a copolymer of ethylene is desired, the monomeric feed to the polymerization zone generally contains a major portion of ethylene and a minor portion of an olefin having a higher molecular weight, such as, for example, propylene, 1-butene, 1-pentene, and the like. The polymerization reaction can be conducted in the gaseous phase, the liquid phase, a mixed gas-liquid phase, or any other known contacting procedure.

In a preferred application, there is provided by the method of this invention an ethylene-1-butene copolymer blend having a melt index in the range of 0.07 to 0.50, and a density [1] in the range of 0.935 to 0.950. In one embodiment, the components blended are copolymers of ethylene and butene-1, which components, for the sake of convenience, are referred to herein as "Component A" and "Component B."

Component A is ordinarily a particle form homopolymer of ethylene or a copolymer of ethylene with 1-butene, but can generally be a copolymer of ethylene with an aliphatic monoolefin having from 3 to 8 carbon atoms per molecule. Component A has a density from 0.930 to 0.943 gram per cc., and a high load melt index [2] in the range of 0.5 to 15.0. Component B can be a solution formed homopolymer of ethylene or a copolymer of ethylene with a monoolefinic comonomer, such as 1-butene, as described in connection with Component A. Component B has a density in the range of 0.940 to 0.960, and a melt index [3] in the range 1.0 to 20.0.

In the practice of the invention, the desired final polymer blend temperature is set, and the mixing time in the mixing zone controlled by the introduction of water to the mixing zone prior to the compounding of the polyolefin polymers. The length of the mixing period is directly related to the amount of water introduced into the

---

[1] Density determined by ASTM D1505–57T.
[2] High load melt index; ASTM D–1238–57T (Condition F). The rate of flow of a molten resin through a 0.0825-inch orifice when subjected to a force of 21,600 grams at 374° F.
[3] Melt index as determined by ASTM D–1238–57T (Condition E). The HLMI of particle form polymers ordinarily ranges from 0.5 to 15.0, preferably 0.9 to 4.0; whereas the melt indices of solution polymers ordinarily range from 1.0 to 20.0, and preferably 0.2 to 5.0.

mixing zone. The introduction of water into the mixing zone lowers the rate of temperature rise in the mixing zone. By keeping the mixing temperature relatively low (lowering the rate of temperature rise), that is, in the range 285 to 340° F., the viscosities of the individual polymer melts are higher and the power requirement for a given rotor r.p.m. is substantially increased. The increased power requirement is due to increased shearing effected in the mixing zone. Effectiveness of mixing is a function of shear and, therefore, effectiveness of mixing is indicated by increased power adsorbed due to the addition of water.

Preferably, in the operation of this invention, the polyolefins are melt blended until the maximum allowable temperature is obtained in the mixing zone and the pressure removed so as to vent the steam from the mixing zone. The pressure is reapplied to the mixing zone and the stirring of the blend is continued until a desired final melt temperature is obtained.

Conventional mixing means capable of melt mixing the polymers in a confined space can be employed in the preparation of the homogeneous product. Suitable mixing means include the Stewart-Bolling Intensive Machine (Model 12M) and Banbury type mixers, such as distributed by Farrel-Birmingham Company, Inc., Ansonia, Connecticut. The water is introduced into the mixing zone prior to the beginning of the mixing period and preferably concurrently with the charging of the individual polyolefins to the mixing zone.

In one embodiment, according to the present invention, experience has shown that a 50-50 blend of particle form (PF) and solution copolymers, each comprising copolymers of ethylene and 1-butene, must be compounded for a minimum of approximately four minutes if a uniform product is to be obtained. However, if the feed stock is very dry, the temperature of the polymer in the mixer may exceed 360° F. before the required compounding time is reached. From extensive test work, it has been found that if a small amount of water (within the range of 0.1 to 5 weight parts per 100 parts of polyolefins in the mixing zone) is added to the polymers before compounding, mixing time in excess of four minutes can be reached at temperatures well below 340° F. During the course of the mixing cycle, and at a temperature of 305° F., the intensive mixer is vented and the vaporized water escapes from the molten polymer blend.

In another embodiment of this invention, it has been found that 40 percent PF with an HLMI between 1.5 and 4 and a density between .939 and .943 and 60 percent solution copolymer of ethylene and butene-1 or a homopolymer of ethylene with an MI of 5 to 8 and a density of .947 to .951 can be mixed and the rate of temperature rise in the mixing zone controlled by adding 3 percent by weight of water to the polymers. The mixer is operated for about 150 seconds until the temperature of the polymer being mixed reaches a temperature of about 300° F. At this time, the pressure block is removed from the mixer and the water permitted to evaporate. This removal of the pressure block and evaporation of the water causes the temperature of the blend in the mixing zone to be lowered. Next, the pressure block is applied in the mixer and the temperature of the polymer blend increased to between 310 and 320° F. The blend has an MI of 0.2 to 0.3 and a gravity between .945 and .949, at which temperature the polymers are dumped into the extruder.

It is hypothesized that the steam blanket in the mixing zone resulting from water addition according to this invention minimizes the exposure to oxygen, which tends to chemically degrade the polymer, and aids in the maintaining of a constant uniform temperature throughout the mixing zone. It has been found that by operating according to the process of this invention that the amount of antioxidant required to attain a given degree of protection against oxygen degradation was reduced by about 50 percent.

The following examples are presented to illustrate the objects and advantages of the invention. It is not intended that the specific embodiments presented therein should unduly limit the invention.

*Example I*

246 pounds of a solution form copolymer of ethylene and 1-butene with a density of 0.950 gm./cc., melt index of 6.2 to 6.3, and containing 0.1 percent or less water, were dumped in the hopper of a Stewart-Bolling Intensive Mixer (Model 12M), along with 164 pounds of a particle form copolymer of ethylene and 1-butene, with a density of 0.935 gm./cc., high load melt index of 1.3 to 1.6, and containing essentially no water. 0.03 percent wt. Ionol,[1] an antioxidant, was added to the hopper also. The hopper contents were dumped into the mixer, the ram was lowered and the polymer intensively mixed until it reached a temperature of 320° F., then the ram was lifted, while the rotors continued to run, and the polymer was allowed to degas. After about 30 seconds the ram was lowered again and the polymer was intensively mixed until it reached a temperature of 325° F. The mixed polymer was dropped into the hopper of an extruder and the polymer was stranded and pelleted. Bottles blown from this polymer and tested, the blowing and testing method hereinafter described, the polymer having a density of 0.945 gm./cc., and a MI of 0.28 to 0.29, had no better than a D rating (A is best and C is acceptable). More bottles were produced from the same polymers blended in the same ratio and processed the same as above, except that 3 pints water (3.13 pounds equivalent to 0.82 percent $H_2O$ in 410 pounds of polymer, including initial $H_2O$ in solution form polymer fluff) were added to the polymer at the mixer hopper before the polymer was dumped into the mixer. These bottles received C ratings.

In testing the quality of blended polymers, bottles were made of the blended bottles and graded by the degree of streaks in the product bottles. In the preparation of the bottles, a sample of the pelleted blended polymers was extruded to form a 10½″ parison in a mold to form a bottle. Injection pressure for extruding the parison was sufficient to extrude the parison at the rate of 10.0″±⅛″ per 5.0 seconds±0.1 second was provided. The stock temperature during the extrusion was maintained at 430° F. The weight of the extruded bottle was 40±2 grams. The mold temperature was maintained between 55 and 60° F.

The blown bottle was graded as follows:
*Rating:*

A _____ No streaks.
B _____ Very slightly streaked.
C _____ Slightly streaked.
D _____ Streaked.
E _____ Heavily streaked.
F _____ Very heavily streaked.

The term "streaked" as employed above refers to the random alternate translucent and transparent areas of the product blown bottle. A bottle rated as C or better has universal acceptance in the blown container industry.

*Example II*

221 pounds of a solution formed copolymer of ethylene and 1-butene with a density of 0.950 gm./cc., melt index of 6.2 to 6.3, and containing 0.25 weight percent water, were introduced in the hopper of a Stewart-Bolling Intensive Mixer (Model 12M) along with 189 pounds of a particle form copolymer of ethylene and 1-butene, with a density of 0.935 gm./cc., high load melt index of 1.3 to 1.6, containing essentially no water. 0.03 weight percent Ionol, an antioxidant, was added to the hopper also. The hopper contents were mixed with 300 cc. of water (providing 0.25 part by weight water per 100 parts of polymer in the mixture) and the total mixture dumped into the ---
[1] A trademark.

mixer. The ram was lowered and the polymer intensely mixed 2½ minutes until it reached a temperature of 320° F. The ram was then lifted, while the mixer rollers continued to run, and the polymer was permitted to degas. After about 30 seconds, the ram was lowered again and mixing of the polymer continued for about one minute until a temperature of 325° F. was obtained. The mixed polymer was dropped into the hopper of an extruder and the polymer was stranded and pelleted. Bottles blown from this polymer which had a density of 0.945 gm./cc., and an MI of 0.28 to 0.29, had no lower than a C rating, employing the test method previously described.

As will be evident to those skilled in the art, various modifications of this invention can be made, or followed, in the light of the foregoing disclosure, without departing from the spirit or scope thereof.

I claim:

1. A process for blending a first olefin polymer of a given melt index with a second olefin polymer of a significantly different melt index which comprises:
    (a) charging water and said first and second olefin polymers into a mixing zone comprising a confined working space wherein the polymers are subjected to intense mixing action, the water being added in an amount in the range of 0.1–5 weight parts water per 100 weight parts of polymer to be blended;
    (b) subjecting the resulting mixture of first and second olefin polymers and water to an intense mixing action at a temperature between 285 and 340° F.;
    (c) venting vaporized water from said mixing zone; and
    (d) thereafter recovering the resulting blend of said first and second olefin polymers from said mixing zone.

2. A process according to claim 1 wherein said first olefin polymer is a particle form polyolefin and said second olefin polymer is a solution formed polyolefin.

3. The process according to claim 1 wherein the intensive mixing is carried out for a period in the range of 2 to 6 minutes.

4. A process according to claim 1 wherein said first olefin polymer is a particle-form copolymer of ethylene and 1-butene and said second olefin polymer is a solution-formed copolymer of ethylene and 1-butene.

5. A process for blending a first olefin polymer of a given melt index with a second olefin polymer of a significantly different melt index which comprises:
    (a) charging said first and second olefin polymers into a mixing zone comprising a confined working space wherein the polymers are subjected to intense mixing action;
    (b) charging concurrently with said polymers water in an amount in the range of 0.1 to 5.0 weight parts water per 100 weight parts of polymer to be blended;
    (c) subjecting the resulting mixture of first and second olefin polymers and water to intense mixing action at a temperature between 285 and 340° F.;
    (d) venting vaporized water from said mixing zone;
    (e) subjecting said first and second olefin polymers to additional intensive mixing so as to raise the temperature to between 285 and 340° F.; and
    (f) thereafter recovering the resulting blend of said first and second olefin polymer from said mixing zone.

6. A process according to claim 5 wherein said first olefin polymer is a particle form polyolefin and said second olefin polymer is solution-formed polyolefin.

7. A process according to claim 5 wherein the intensive mixing is carried out for a period in the range of 2 to 6 minutes.

8. A process according to claim 5 wherein said first olefin polymer is a particle-form copolymer of ethylene and 1-butene and said second olefin polymer is a solution-formed copolymer of ethylene and 1-butene.

References Cited by the Examiner

UNITED STATES PATENTS

| 2,582,327 | 1/1952 | Haine | 264—140 |
| 3,179,719 | 4/1965 | Cines | 260—897 |

OTHER REFERENCES

Renfrew et al.: "Polythene," 2nd ed. 1960, Interscience Publishers Inc., New York, pp. 411–413. (Copy in Scientific Library.)

MURRAY TILLMAN, *Primary Examiner.*

E. B. WOODRUFF, *Assistant Examiner.*